Dec. 3, 1968 R. B. HUMPHREY 3,414,880

SOURCE ERROR CORRECTION FOR RELATIVELY MOVING SIGNALS

Filed July 2, 1965

INVENTOR
ROBERT B. HUMPHREY

BY Bernard M. Goldman

ATTORNEY

United States Patent Office 3,414,880 Patented Dec. 3, 1968

3,414,880
SOURCE ERROR CORRECTION FOR RELATIVELY MOVING SIGNALS

Robert B. Humphrey, Poughkeepsie, N.Y., assignor to International Business Machines Corporation, Armonk, N.Y., a corporation of New York Filed July 2, 1965, Ser. No. 469,113
11 Claims. (Cl. 340—146.1)

This invention relates to source error correction for a signal stored on a moving recording surface.

This invention can recover or correct a weak signal read from or recorded on a relatively moving surface, such as a disk or magnetic tape, by changing the thickness of a lubricating gas separation between the recording surface and a signal transducer in response to a detected signal error. The purpose of the gas lubricating separation is to eliminate or reduce wear on the recording surface and on the transducer.

This invention may be used with the gas lubricating device described and claimed in patent application Ser. No. 463,727, filed June 14, 1965, now U.S. Patent No. 3,327,916, by J. A. Weidenhammer et al., entitled "Vacuum Controlled Air Film," and assigned to the same assignee as the present application. This lubricating device is capable of precisely controlling the thickness of a lubricating gas separation to the order of millionths of an inch, which is necessary for recording densities exceeding 1000 bits per inch.

A normal lubricating gas film thickness is used during reading or writing information on the surface. The normal gas separation is chosen by using the maximum separation that reliable operation permits with a normal recording surface. However, occasionally and unpredictably, a recording surface has defects which result in reading an erroneous signal. The existence of a defect in the surface is identified by the detection of an error in information read from the surface. Conventionally, in such case with magnetic tape, the same information is reread or rewritten without effecting any gas separation. This invention adds the factor of decreasing the separation before the rereading or rewriting. When rereading a defective area, the closer separation strengthens the signal amplitude and resolution received by a magnetic head, so that in most cases, the information can be detected without error. Thus, the invention obtains error recovery or correction by improving the flux signal transmitted from or received by the relatively moving storage source.

Prior error recovery techniques changed either the amplification level or the clipping level for a sensed signal to improve the discrimination of the signal under special low-sensed level conditions. These prior techniques did not suggest or have any effect on the head to tape spacing as an element of the error recovery procedure. U.S. Patent 3,078,448 to H. A. O'Brien entitled "Dual Channel Testing," read the bits of each character into high and low level base-clipping circuits, which are compared bit-for-bit. Character error detection is also applied to at least the high-clip circuit from which each character is normally transferred. If an error in the high-clip character is detected (generally caused by a weak sensed signal), the low-clip circuit output is transferred instead. If an error exists in the low-clip output, the tape record is reread one or more times until no error is detected, or until the error continues after a maximum number of rereadings in which case the tape drive is stopped or the error is ignored. In any case, the head-to-tape spacing relationship is not affected.

It is, therefore, the primary object of this invention to controllably reduce the gas lubricating film distance between the transducer and the relatively moving recording surface, in response to detecting an error in a signal sensed from the surface in order to obtain a more definitive signal relationship between the tape and the transducer. A single bit error in a record can cause the distance reduction over the entire record.

This invention provides an error control system for signals recorded on a surface, which is to be sensed and/or recorded upon by relative motion between the surface and a transducer, which is separated from the surface by a controllable spacing. Error detecting means is provided for detecting the sensed output from the transducer. Means is provided for reducing the separation between the surface and the transducer in response to the detection of an error so that the same information can be reread or rewritten from or upon the surface to recover or correct the information.

The foregoing and other objects, features and advantages of the invention will be apparent from the following more particular description of the preferred embodiment of the invention as illustrated in the accompanying drawing.

Figures 1, 2:
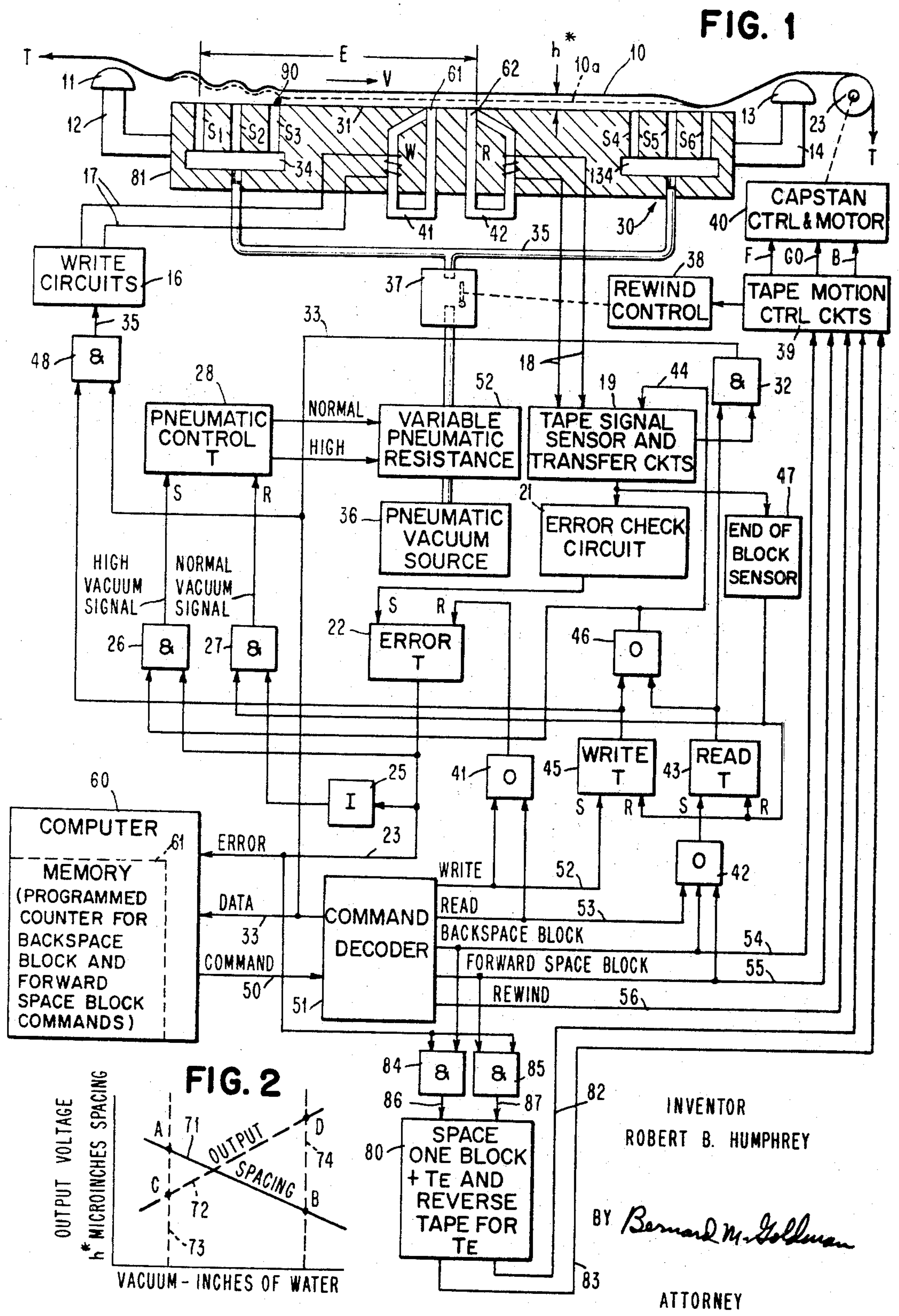
FIGURE 1 shows an embodiment of the invention.
FIGURE 2 is a diagram used in explaining the operation of the embodiment in FIGURE 1.

In FIGURE 1, a tape 10 is controllably moved by a capstan 23, which may be a capstan of the type explained in U.S. Patent Application Ser. No. 246,757, filed Dec. 24, 1962, now U.S. Patent No. 3,225,990 entitled "Digital Tape Drive System," and assigned to the same assignee as the present invention. Tape 10 is moved past a write head gap 61 and a read head gap 62, which are flush with a surface 31 of an air film lubricating device 30, which is described and claimed in U.S. Patent No. 3,327,916, supra. Briefly, device 30 provides a lubricating film of air having a controlled thickness $h^*$ between surface 31 and tape 10, as tape 10 moves between supports 11 and 13 at a velocity V (in the direction of the arrow) over surface 31. The arrow indicates the forward direction of tape controlled by capstan 23 caused by energizing the forward line F and move line GO to the capstan motor and control circuits 40. The reverse rotation of capstan 23 causes the tape to move in the opposite direction in response to energization of backward line B and move line GO to circuit 40. Tape is stopped when the move line GO is deenergized.

When tape is moved in either direction at velocity V, a particular film thickness $h^*$ is maintained over substantially the entire surface 31 between the two sets of vacuum ports $S_1$, $S_2$, $S_3$ and $S_4$, $S_5$, $S_6$ while a particular vacuum pressure is being applied to the ports, such as for example a pressure of five inches of water. The ports are transversely formed through surface 31 into the body of device 30. Each set of ports is connected to a respective common chamber 34 or 134, which communicates with a pneumatic vacuum source 36 through tubing 35, an OFF-ON control valve 37, and a variable pneumatic resistance 52. Only the one set of ports preceding the head gaps is effective. Thus, ports $S_1$, $S_2$, $S_3$ are effective for forward tape motion and ports $S_4$, $S_5$, $S_6$ are effective during backward tape motion. The ineffective set of ports may have their vacuum shut off by means not described herein but described and claimed in U.S. Patent No. 3,327,916, supra.

Each of ports $S_1$, $S_6$ has a width that is sufficiently small that the web cannot be injured under any operating conditions such as if the vacuum attempts to suck in the web when it is stopped. The transverse length of each slot is determined by the width required for the utilized air bearing, which is generally at least as wide as the head gaps being used. The vacuum form source 36 need not be great; for example, it may be only a few inches of water. The slots are spaced from each other and from the ends 81 and 82 of body 30 in the manner generally described in U.S. Patent No. 3,327,916 supra.

Supports 11 and 12 hydrodynamically support tape during movement of the tape during which an air film forms between the tape and each support 11 and 13, respectively. The thickness of this air film over each support 11 or 13 is not controllable in the manner of the film over surface 31. A few thousandths of an inch film thickness variation over supports 11 and 13 make no significant difference to a tape read or write operation, while such variation in film thickness over surface 31 cannot be tolerated for high density recordings. The supports 11 and 13 are connected to body 30 by means of rigid projections 12 and 14. The tape is drawn between supports 11 and 13 with a tension T, in the manner generally provided for tape on a tape drive, such as vacuum columns, pivoted buffer arms, drag clutches on reels, opposing constant torque reel motors, etc.

When the tape is not moving, and no vacuum is applied from source 36, the tape assumes a straight line position betwen supports 11 and 13.

When vacuum is applied to the slots and tape is moved at velocity V, the moving tape acquires the static form represented by the tape path 10, shown in FIGURE 1 between supports 11 and 13, as explained in U.S. Patent No. 3,327,916, supra.

Vacuum may be shut off to all ports by closing valve 37 which is done when tape is to be rewound. This moves the tape further away from surface 31 to the straight line position between supports 11 and 13. A high rewind velocity moves the tape still further away from surface 31 due to the increased hydrodynamic film thickness over support bearings 11 and 13 at higher velocity.

Variable pneumatic resistance 52 is initially controlled at a normal value under the normal output actuation of a pneumatic control trigger 28. Pneumatic resistance 52 may be any type, of which many forms are known in the art; for example, a two-position electromagnetic valve can control two different post openings to prevent two different resistances, or a butterfly valve may be rotated to control the variable resistance as a function of an electrical signal. The normal value of resistance 52 is obtained when control trigger 28 is in reset status; and a lower value of resistance 52 is obtained when trigger 28 is in set status.

Gap 61 is in a write head 41 which has a write coil W that is connected to write circuits 16 which may be any type, such as NRZI or phase encoders found in standard computer tape controls. Likewise, gap 62 is in a read head 42 which has a read coil R that is connected to a circuit arrangement 19 that senses and transfers the signals. The tape signal sensor and transfer circuits 19 may be of the type commonly found in present day computer tape controls. Read gap 62 is used during both reading and writing tape. While writing tape, gap 62 reads the information written by gap 61 for checking the written data. Hence, both gaps 61 and 62 are used during writing tape, but only gap 62 is used when reading tape to a computer.

A computer 60 provides the information which is to be written on tape 10, and receives the information read from tape 10. Information to be written, information that is read, and tape operation commands are transferred over a data bus 33 which connects the computer to input 34 of write circuits 16 and output 32 of sensor and transfer circuits 19.

The form of the computer commands provided on the computer interface lines 23, 33 and 50 from the computer 60 to the tape control circuits are described in U.S. Patent application Ser. No. 393,611, filed Sept. 1, 1964, now U.S. Patent No. 3,336,582 entitled "Interlocked Communication System" by W. F. Beausoleil et al. and assigned to the same assignee as the present specification. Bus 33, of course can operate in only one mode at a time, or it can transfer information being read from tape; or it can transfer a command to a tape command decoder 51, but it can only do one at a time. The particular mode of transfer on bus 33 is identified by a coded set of command pulses issued from the computer to the command decoder 51, which decodes the command by energizing one of the decoder output lines 52, 53, 54, 55 or 56 to indicate whether the command was to write, read, backspace block, forward space block, or rewind, respectively. The decoded command is provided to tape control circuits that digest the command and generate responsive signals to the tape drive to cause it to respond in the manner that executes the command. Deccoder 51 and motion control circuits 39 may be similar to those described in U.S. Patent application, Ser. No. 357,367, filed Apr. 6, 1964, and assigned to the same assignee as the present application.

A read or write command is executed by reading or writing the next block on the tape. A backspace block command is executed by backspacing the tape by one block. A forward space block command is executed by spacing the tape forward by one block. A rewind command is executed by rewinding the tape to a beginning of tape marker.

A decoded read command on bus 53 passes through an OR circuit 42 and sets a read trigger 43. On the other hand, a decoded write command on bus 52 sets write trigger 45. Only one of triggers 43 or 45 can be set at one time. When write trigger 45 is set, its output enables an AND gate 48 (exemplary of a set of gates) to pass write signals on bus 33 to write circuits 16. It is only when read trigger 43 is set that an AND gate 32 (exemplarly of a set of gates) is enabled to pass the read head output from the sensor and transfer circuits 19 to the data bus 33 for reception of the tape signals by the computer.

When the write trigger is set, the read head is, however, used for error checking, even though the read data is not transferred to bus 33. Thus, when either read trigger 43 or write trigger 45 is set, its output is passed through an OR circuit 46 to an enabling input 44 of the sensor and transfer circuits 19 to enable signals read from tape 10 to be applied to error check circuits 21, which, for example, may be the vertical redundancy check circuits (VRC) found in commercial digital tape controls.

Data is conventionally written on magnetic tape in digital block form with gaps between data blocks varying from 0.4 inch to eight inches or more, depending upon the particular tape system and quality of the tape. After a digital tape block is read from tape, its end is signalled by an end-of-block sensor 47 connected to an output of circuit 19. End-of-block sensor 47 may be any of several conventional types, such as a time-out circuit with a time-out longer than the period between characters within a block, so that there is no time-out indication as long as the characters within a block are being received; but when the end of the block is reached and no character is received within the time-out period, the time-out occurs to signal the end of the block. Standard time-out circuits are available in the form of a holdover single shot, or a delay counter which have been previously used in the United States in commercial tape controls. Also, some prior tape systems have a separate block marker track on tape with a mark therein indicating the end of the block. Also, a special data character at the end of a block can be decoded to indicate the end of the block. Sensor 47 may be any of these circuits.

An error trigger 22 is set in response to an error indication from the output of error check circuit 21. Error trigger 22 is reset in response to a read or write command signalled as a pulsed signal on lead 52 or 53 passed through an OR circuit 41 to the reset input of trigger 22.

An error is signalled by an up output from trigger 22, which is provided on lead 23 back to computer 60 so that the computer can respond in a particular programmed manner whenever an error is signalled.

Tape motion control circuits 39 control the movement of capstan 23 to either move tape forward (F), or backward (B) or stop it in the manner necessary to execute any of the decoded commands; write, read, backspace block, forward space block, or rewind. The output of circuit 39 is provided by the forward direction line F, the backward direction line B, and the move line GO. Tape is stopped when the move line GO output of circuit 39 is deenergized. When the GO signal is energized to the capstan drive motor control circuits 40, the capstan drive motor rotates in either a forward or backward direction according to which of lines F or B is also activated to the drive motor control circuits 40. The capstan motor and control circuits 40 may be those shown and claimed in allowed U.S. Patent Application, Ser. No. 246,757, filed Dec. 24, 1962, now U.S. Patent No. 3,255,990 titled "Digital Drive System," which utilizes the signals on the three lines to energize the capstan motor to move in either forward, backward direction or to be in a stopped condition.

The pneumatic control trigger 28 is reset at the end of each tape block read or written, in which no error has been indicated by error check circuit 21. This is done by a circuit including an AND gate 27 which provides an output to the reset input of control trigger 28. Gate 27 receives as inputs a no-error indication of trigger 22 from an invert circuit 25, and an end-of-block signal from sensor 47. Thus, if trigger 22 registers no-error, its output is down and inverter 25 indicates an up signal through gate 27 momentarily at the end of a block to the reset input (R) of trigger 28.

If an error is ever signalled by trigger 22, it causes the pneumatic control trigger 28 to be set to signal a high vacuum indication. This is done by means of a circuit including an AND gate 26, which is enabled by an error input from trigger 22 and an output from OR circuit 46. Circuit 46 provides an output whenever tape is being written upon or read from in response to write trigger 45 or read trigger 43 having been set by a command from the computer.

When trigger 28 is set, it provides a high vacuum output signal to variable pneumatic resistance 52, that responds by reducing its pneumatic resistance to thereby decrease the pnuematic pressure to ports $S_1$ through $S_6$. This causes the air film spacing $h^*$ to be reduced. Then the tape moves closer to the surface 31 and thereby moves in closer proximity to the write and read gaps 61 and 62. As the tape moves with a smaller spacing from surface 31, any recorded signal on the tape is sensed by read head 62 with greater intensity and resolution so that a weak signal becomes more recoverable than at the greater normal distance $h^*$ obtained with the normal vacuum pressure. Similarly, when writing on tape, any write signal from gap 61 to the tape is received by the magnetic surface with more intensity and resolution than it was received using the normal $h^*$, so that the tape is more likely to be recorded upon without error with the smaller spacing condition.

FIGURE 2 illustrates a relationship between the amount of vacuum pressure applied to ports $S_1$ through $S_6$, spacing $h^*$, and the read head output voltage for a fixed-level recorded signal on the tape. Curve 71 shows the relationship between the $h^*$ lubricating film spacing in microinches and the vacuum at the ports in inches-of-water. Similarly, curve 72 shows the relationship between the read head voltage output as a function of the vacuum applied to the ports.

The normal vacuum pressure 73 is determined by a number of operating factors such as the density of the signals to be recorded on the tape, the head gap size, the coercivity of the magnetic surface on tape 10, the consistency in quality of the magnetic recording surface, and the reliability expected for recording data on the tape. It is presumed in this particular disclosure that very high reliability is required, such as not having more than one permanent character error in ten billion characters read from tape. For example, the normal vacuum 73 may be chosen to provide an $h^*$ spacing of 80 microinches for normal tape operation, as for example, a recorded bit density involving 3200 flux switchings per inch.

The high vacuum pressure is chosen for reading or writing tape under error conditions which are very likely to be removed by the greater vacuum pressure. Thus, the high vacuum 74 has a value within the range from normal vacuum value 73 up to and including a value which obtains in-contact movement of the tape with respect to surface 31. In the example of FIGURE 2, it is assumed that high vacuum value 74 is chosen to reduce the spacing $h^*$ to approximately one-half the normal operating value of $h^*$. Reducing $h^*$ to one-half approximately doubles the output voltage and signal resolution sensed by the read head gap 62 and approximately doubles the intensity and resolution of any write head flux applied to the tape. Thus, high vacuum value 74 intersects spacing curve 71 at $h^*$ spacing B and intersects output curve 72 at output voltage D; and the low vacuum value 73 intersects these curves at points A and C, respectively.

In operation, while writing or reading tape, whenever an error signal is sensed by circuit 21 to thereby set error trigger 22, a signal is applied immediately from trigger 22 through gate 26 to set pneumatic control trigger 28. Accordingly, the tape is moved closer to the head gaps 61 and 62 as soon after an error is sensed as the electromechanical and pneumatic nature of the system permits. Then the tape is moved backward until the beginning of the tape block having the error is positioned anywhere to the left of distance E in FIGURE 1. Then the tape is moved forward by distance E, and the tape is positioned ready for the block in error to be rewritten or reread.

Since trigger 28 controls an electromechanical device (which is the variable pneumatic resistance 52), and a pneumatic pressure change must take place over a volume of air (even though it is small), it will be a matter of one or more milliseconds before the vacuum at the ports $S_1$ through $S_6$ is changed from the low level to the high level, such as from five to ten inches of water. By the time the high vacuum level is obtained at the ports, it is likely that the end of the tape block (in which the error was sensed) has been reached, and that a backspace block command has been given by the computer and is being executed by the motion control circuits 39. Thus, at about the time capstan 23 can begin to drive the tape in the reverse direction (which takes several milliseconds), the vacuum pressure at slots $S_1$ through $S_6$, may be stabilizing to the high value. The backspace component distance E, shown in FIGURE 1, is the distance from the read head gap 62 to the beginning of the first slot $S_1$. (If the tape is reversed to move in the other direction, then distance E would be the distance from the read head gap 62 to the beginning of the opposite slot $S_6$.) The reason for backspacing the tape by the block in error plus at least distance E is to assure that the entire block in error is moved in the forward direction with the reduced $h^*$ spacing since it may not be known where the error is located within the block. The lubricating device 30, shown in FIGURE 1, obtains the particular $h^*$ value correlating with a particular vacuum value, in FIGURE 2, only when this value of vacuum is applied by the plural slots $S_1$, $S_2$ and $S_3$ to the required area of tape as it is being moved at velocity V. Also, the error may be caused by an undesired particle 90 clinging to the tape surface as shown in FIGURE 1. Then particle 90 is backspaced to the left of device 30 beyond distance E. During the forward tape motion at the higher vacuum, particle 90 is brought downwardly toward a smaller $h^*$ with greater force than at the lower vacuum into likely engagement with the trailing edge of at least one of the ports $S_1$, $S_2$ and $S_3$, particularly the latter for very small particles. This increased downward force component at the higher vacuum along with a decreased space component is more likely to dislodge the undesired error-causing particle than was the lower vacuum operation. Once dislodged from the tape, the particle is removed by being sucked into one of a port and into vacuum source 36. If the particle is too large to be sucked into a port, it will be held against the mouth of a port by the vacuum from where it can later be removed. In the latter case, repeated errors may cause the drive to halt for manual servicing. The large blocking type particles are generally rare compared to the smaller type which are sucked through the vacuum ports or slots Most modern computer systems can handle variable length tape data blocks; and the matter of the choice of the number of characters in a tape block is left to the option of the computer programmer. Tape data rate efficiency requires making a tape block as long as practical. Hence, the length of tape occupied by a block can vary greatly. For example, an eighty character tape block at a 1600 character per inch density occupies one-twentieth of an inch tape length; and a 16,000 character block hence occupies ten inches of tape. However, the interblock gap (IBG) will be approximately the same between all blocks regardless of block length. Thus, there is no assurance that either the IBG or block length will equal distance E in FIGURE 1. Short blocks will generally be less than distance E, while long blocks may be much greater than distance E. Since E merely specifies a minimum distance for backspacing tape beyond the beginning of the block in error in response to a read or a write error, tape may be backspaced more than distance E to accomplish the same purpose, although at the expense of more time if the amount of the backspace is more than necessary. Hence, it is most efficient to backspace the tape block having the error plus additional backward tape movement by the distance E. The backspacing by at least the distance E may be accomplished in either of two equivalent ways, which are: (1) a hardware circuit such as time-out circuit 80 or (2) a stored program backspace and forward space subroutine which is stored in memory 61 of computer 60 in FIGURE 1. Circuit 80 causes the tape to move in a chosen direction by one data block plus a period of time $T_E$ and then to reverse movement for time $T_E$ at the same velocity. The hardware for spacing tape either backward or forward by one block length is within present commercial tape controls and includes the end-of-block sensor 47. Means for spacing tape for a period of time is also within present commercial tape controls, such as the write delay circuit or the read delay circuit found therein. Circuit 80 receives as an input either an error-backward signal 86 or an error-forward signal 87 from an AND gate 84 or an AND gate 85, respectively. Gate 84 is enabled by an error signal from trigger 22 and a backspace block signal from decoder 51. Similarly, gate 85 is enabled by an error signal from trigger 22 and a forward space block signal from decoder 51. When reading or writing tape in the forward tape direction, the error-backward input 86 causes the tape to be backspaced by one block, and then continues backward movement at velocity V for a period of time $T_E$, after which the tape direction is reversed and movement is continued at the same speed for the period of time $T_E$. Time $T_E$ is determined as the time needed to move tape for the distance E at the nominal tape velocity V. Similarly, when reading tape in the backward tape direction, circuit 80 responds to an error-forward input 87 to cause the tape to be spaced forward by one data block plus the distance E in time $T_E$ and then to move in the backward direction for the distance E in time $T_E$. With either input 86 or 87, the operation of circuit 80 ends when the interblock gap preceding the erroneous tape block is over write and read head gaps 61 and 62. A computer read or write command can be signalled at the ending of the second $T_E$ time-out so that the tape block can be reread or rewritten, as the circumstances require.

As mentioned above, the computer contains a memory 61 in which is stored a tape error subroutine program that is branched to in response to an error indication from trigger 22. The programmed error subroutine may be the conventional tape cleaner blade and reread or rewrite routine, used when an error is found on a tape. This program involves backspacing the tape block having the error over a cleaning blade and rereading or rewriting the tape block, as the case may be. The tape cleaner program subroutine comprises a sequence of backspace block commands wherein the number of such commands assure that the tape is moved backward by at least one block plus the distance to the cleaner blade and then tape is moved forward by forward space block commands (one less than the number of backspace block commands) to position the heads at the beginning of the block to be rewritten or reread. The simplest form of this program ignores the length of the data blocks and only depends on the approximate invariable, the interblock gap (IBG) length. Thus, after backspacing the block in error, it specifies a number of backspaces in which that number multiplied by the IBG length is equal to or greater than the distance to the cleaner blade (the program equivalent to distance E). Then the same number of forward space block commands is given to move the tape by the same distance to the beginning of the block in error, which is then positioned for the error recovery reread or rewrite. A more sophisticated program takes into account the length of the data blocks being backspaced, and this reduces the number of backspace block instructions and forward space block instructions if the blocks have significant length, which results in a program subroutine that takes less time; since less tape movement will result where the tape data blocks have substantial length. For example, if the interblock gap size is one-half inch, but if the records have 80 characters each, they will occupy only one-twentieth of an inch at a density of 1600 bits per inch, in which case, the length of the data blocks can be ignored in the program without substantial time loss. However, if data blocks have for example 16,000 characters each and each block occupies ten inches of tape, which is many times larger than the one-half inch interblock gap, the program would be much more efficient by considering the length of each block.

Where the block length is equal to or greater than distance E, the program need comprise only two backspace block commands followed by one forward space block command and the read or write command in order to reread or rewrite the block in error. If an error remains after the first rewriting or rereading with reduced $h^*$, a second rewriting or rereading is attempted, then a third if necessary, etc., until the error is corrected or a maximum number of rewritings or rereadings have occurred and the error persists. After, for example, 100 rereadings, the tape drive may be stopped and a print out of the data obtained for reconstructing the information in error. After a few rewritings, the tape may be erased forward before the next rewriting attempt. Tape reread and rewrite subroutines have been used in the U.S.A. on computer installations for a number of years. U.S. Patent 2,975,407 to H. A. O'Brien entitled "Erase Forward" is an example of a patent disclosing and claiming means for cyclically backspacing a block for rewriting while an error persists, and then moving tape forward for a fixed period of time before again rewriting the block. But, of course, such prior tape rewrite or reread operations were not used with any reduced spacing $h^*$ for increasing the intensity of the recorded signals sensed by the read head which is the basis for the present inventive combination of elements. Instead, these prior subroutines were operated in conjunction with an electronic dual-channel sensing operation, which used plural clipping levels for the tape signals sensed by the read head. The dual-channel sensing error-recovery technique, and circuits therefor, are described and claimed in U.S. Patent 3,078,448 to H. A. O'Brien.

A rewind command from the computer is conveyed to motion control circuits 39, after being decoded by circuit 51. Then, control circuits 39 actuate a rewind control 38 which electromechanically responds to close a valve 37 and cut off the vacuum to the slots $S_1$ through $S_6$. In response thereto, the tape moves further away from surface 31 while it is being rewound, due to motion by capstan 23 as the capstan motor and control circuits respond to the GO and B outputs of circuit 39.

The circuit of FIGURE 1 can also be used with a flexible rotating disk. In this case, item 10 may be considered a flexible disk; and capstan 23 and the forward, stop, backward and rewind motion control circuits, shown in FIGURE 1, can be eliminated for disk control purposes because the continuous cyclic rotation of a disk inherently can bring an error-containing area back to the head, as long as the head is not moved away. Thus, the invention causes a reduced $h^*$ spacing to a disk head arrangement in the same manner as explained for a tape head arrangement. Generally, the reduced $h^*$ spacing will be obtained by the time the erroneous area makes its next rotation pass under the head, so that an effective error recovery or rewriting can then be attempted. It generally takes several milliseconds per disk revolution, which hence is the time between reread or rewrite operations on the disk magnetic surface.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. An error control system for recorded signals comprising a surface for recording signals, a transducer for said signals, means for separating said surface and said transducer by a normal distance, pneumatic control means for controlling said separating means to obtain said normal distance or a smaller distance, means responsive to signals from said transducer for detecting an error in a data signal recorded on said surface, and means responsive to an output signal from said detecting means, indicative of an error, for actuating said pneumatic control means to obtain said smaller distance between said surface and said transducer, whereby error control for recorded signals is improved at said smaller distance.

2. An error control system as defined in claim 1 in which a vacuum source is connected to said separating means.

3. An error control system as defined in claim 1 in which said surface is a magnetic surface.

4. An error control system as defined in claim 1 in which said transducer is a read head.

5. An error control system as defined in claim 1 further comprising a second transducer in which said second transducer is a write head.

6. An error control system as defined in claim 1 in which said pneumatic control means is an electrically controlled pneumatic resistance.

7. An error control system as defined in claim 1 in which said means for detecting an error is a parity redundancy check circuit.

8. An error control system as defined in claim 1 in which said means reponsive to an output signal from said detecting means is a bistable circuit.

9. An error control system as defined in claim 1 in which said means for separating comprises a body supported adjacent to said surface, said body having a selected area over which said normal and smaller pneumatic distances are precisely controlled, air volume reduction means provided through the surface of said body preceding said selected area in a direction of relative movement between said surface and said body, and said transducer being mounted in said selected area flush with said area.

10. An error control system as defined in claim 9 further including a vacuum source, pneumatic resistance means connected between said air volume reduction means and said vacuum source, and said pneumatic control means conected to said pneumatic resistance means to control at least first and second values of vacuum pressure to obtain said normal and smaller pneumatic distances in response to said error detecting means.

11. An error control system as defined in claim 10 in which said air volume reduction means includes a plurality of ports in said body.

No references cited.

MALCOLM A. MORRISON, *Primary Examiner.*

C. E. ATKINSON, *Assistant Examiner.*